(12) United States Patent  (10) Patent No.: US 9,855,529 B2
Brummer                     (45) Date of Patent:     Jan. 2, 2018

(54) METHOD FOR CLEANING A FILTER (71) Applicant: Franz Brummer, Landshut (DE)

(72) Inventor: Franz Brummer, Landshut (DE)

(73) Assignee: HIGHQ-FACTORY GMBH, Eschau-Hobbach (DE)

( * ) Notice: Subject to any disclaimer, the term of this patent is extended or adjusted under 35 U.S.C. 154(b) by 562 days.

(21) Appl. No.: 14/361,347

(22) PCT Filed: Dec. 18, 2012

(86) PCT No.: PCT/EP2012/075983
§ 371 (c)(1),
(2) Date: May 29, 2014

(87) PCT Pub. No.: WO2013/092606
PCT Pub. Date: Jun. 27, 2013

(65) Prior Publication Data
US 2014/0332467 A1  Nov. 13, 2014

(30) Foreign Application Priority Data
Dec. 19, 2011  (DE) .................. 10 2011 056 633

(51) Int. Cl.
*B01D 61/14*  (2006.01)
*B01D 61/22*  (2006.01)
(Continued)

(52) U.S. Cl.
CPC .......... *B01D 61/22* (2013.01); *B01D 61/145* (2013.01); *B01D 65/02* (2013.01); *B24B 37/04* (2013.01);
(Continued)

(58) Field of Classification Search
None
See application file for complete search history.

(56) References Cited

U.S. PATENT DOCUMENTS 5,034,121 A   7/1991  Budin et al.
6,527,969 B1  3/2003  Tanoue et al.
(Continued)

FOREIGN PATENT DOCUMENTS

CN     1946472 A      4/2007
DE  40 37 329 A1      5/1992
(Continued)

OTHER PUBLICATIONS

International Search Report of PCT/EP2012/075983 dated Apr. 12, 2013.

*Primary Examiner* — Bobby Ramdhanie
*Assistant Examiner* — Michael An
(74) *Attorney, Agent, or Firm* — Sughrue Mion, PLLC (57) ABSTRACT A method for cleaning a cross-flow filter (20), comprising the steps of: A) providing a cross-flow filter (20), wherein the cross-flow filter (20) comprises a filter membrane (21) and is configured to remove a liquid permeate stream and the filter membrane (21) comprises a first side facing the permeate stream and a second side opposite the first side, the second side facing the feed stream, and wherein at least some of the deposits (1010) to be removed are located on the second side of the filter membrane (21); B) applying a back-flushing liquid stream through the filter membrane (21). Prior to applying the back-flushing liquid stream in Step B), permeate located on the first side of the filter membrane (21) is at least partially displaced from the first side of the filter membrane (21) by a gas, wherein the gas that is in contact with the back-flushing liquid stream has a pressure of >1 bar at least during Step B). The applying of the back-flushing liquid stream in Step B) occurs in such a way that the pressure pulses.

13 Claims, 5 Drawing Sheets (51) Int. Cl.
  *B01D 65/02* (2006.01)
  *B24B 37/04* (2012.01)
  *B24B 57/02* (2006.01)
  *C02F 1/44* (2006.01)
  *B01D 63/02* (2006.01)
  *C02F 103/34* (2006.01)

(52) U.S. Cl.
  CPC .............. *B24B 57/02* (2013.01); *C02F 1/444* (2013.01); *B01D 63/02* (2013.01); *B01D 2313/18* (2013.01); *B01D 2321/04* (2013.01); *B01D 2321/18* (2013.01); *B01D 2321/185* (2013.01); *B01D 2321/2066* (2013.01); *C02F 2103/346* (2013.01); *C02F 2303/16* (2013.01)

(56) References Cited

U.S. PATENT DOCUMENTS 6,929,532 B1* 8/2005 Seaman ................. B24B 37/04
                                                        451/36
2002/0060193 A1   5/2002 Ando et al.
2004/0069878 A1   4/2004 Osuda et al.
2004/0139992 A1*  7/2004 Murkute ................ B01D 61/14
                                                        134/37
2007/0187326 A1*  8/2007 Bonnelye ............... B01D 63/02
                                                        210/636
2011/0139715 A1*  6/2011 Zha ........................ B01D 65/02
                                                        210/636

FOREIGN PATENT DOCUMENTS

| | | |
|---|---|---|
| DE | 101 20 608 A1 | 1/2002 |
| DE | 10 2005 015 421 A1 | 10/2006 |
| DE | 10 2006 040 451 A1 | 2/2008 |
| DE | 10 2009 044204 A1 | 4/2011 |
| EP | 1 055 446 A2 | 11/2000 |
| JP | 2002079061 A | 3/2002 |
| JP | 2007528290 A | 10/2007 |
| WO | 01/51186 A1 | 7/2001 |
| WO | 2010/111291 A2 | 9/2010 |
| WO | 2011042017 A1 | 4/2011 |

* cited by examiner

METHOD FOR CLEANING A FILTER

CROSS REFERENCE TO RELATED APPLICATIONS

This is a National Stage of International Application No. PCT/EP2012/075983 filed Dec. 18, 2012, claiming priority to German Patent Application No. 10 2011 056 633.3 filed Dec. 19, 2011, the contents of all of which are incorporated herein by reference in their entirety.

The present invention relates to a method for cleaning a filter, comprising the steps of preparing a cross-flow filter, the cross-flow filter comprising a filter membrane and being configured to remove a liquid permeate stream from a feed stream passing by the filter membrane and of applying a back-flushing liquid stream through the filter membrane. The invention further relates to a filter system which can be cleaned according to this method.

In past years, chemical mechanical polishing (CMP) has been established as the standard process for polishing semiconductor materials. In particular, CMP is used following the deposition of functional layers onto semiconductor wafers to smooth out unevenness that occurs during deposition. In the process, a chemically and mechanically active colloidal polishing material, called slurry, is distributed between the semiconductor wafer and a surface to be polished. The semiconductor wafer surface is chemically attacked and polished, supported by the relative motions between the semiconductor wafer and the surface to be polished.

In these types of polishing processes, the surface to be polished must be fed continuously with fresh slurry so that optimum polishing is achieved. During polishing, wastewater is generated, containing both polishing liquid (in general water and slurry) and contaminants from polishing wear. In addition, the wastewater generally contains additional chemicals that control the polishing process. These chemicals can comprise pH regulators, oxidizers and/or stabilizers depending on the type of process. The slurry wastewater is usually discharged and disposed of. Since the slurry and the polishing liquid are both costly to procure, slurry recycling processes offer potentially high cost savings.

For example, DE 10 2009 044 204 A1 discloses a recycling method and a recycling apparatus for recycling slurry wastewater from a semiconductor treatment process, in particular from a chemical mechanical polishing process, wherein the following process steps are carried out: a filtration step in which wastewater containing fresh slurry is continuously routed to a circulation tank while mixed wastewater is continuously removed from the circulation tank, the removed mixed wastewater being routed through an ultra-filtration unit and concentrated thereby into concentrated wastewater by way of the extraction of liquid, and the concentrated wastewater being routed to the circulation tank and mixed with the contents of the circulation tank to obtain the mixed wastewater; and a concentration step which takes place after the filtration step, wherein the feed of fresh wastewater to the circulation tank is reduced or substantially shut down while mixed wastewater is continuously removed from the circulation tank, the removed mixed wastewater being routed through the ultrafiltration unit and concentrated thereby into concentrated wastewater by way of the extraction of liquid, and the concentrated wastewater being routed to the circulation tank.

According to U.S. Pat. No. 6,929,532, a polishing slurry supply for a semiconductor manufacturing process comprises a cross-flow filter. This filter is disposed upstream of a wafer polishing unit. The cross-flow filter can take the form of hollow fibre filters or tubular filters. Such filters can be designed as ultra-filters or micro-filters. A method for operating a chemical mechanical polishing system is also described.

U.S. Pat. No. 6,527,969 discloses a method for recycling polishing slurry from a chemical mechanical polishing process. This method comprises the steps of recovering the polishing slurry and re-dispersing polishing particles in the recovered polishing slurry. In particular, the polishing particles can be dispersed by adding a dispersant, by way of an electromagnetic field, or using ultrasonic irradiation.

WO 2010/111291 A2 describes a device and a method for recovering polishing slurry and rinse water from a CMP process. This publication also relates to rheological measurements and the prevention of agglomeration by using centrifugal pumps.

EP 1 055 446 A2 deals with a method for manufacturing a semiconductor device in which the incident wastewater is cleaned through filtration. In this method, particles captured by a first filter film are used as a second filter film. To maintain the filtering capacity, plugging of the first filter is prevented and an external force such as gas bubbles acts on the second filter film. When the particles to be removed are mixed with the filtered water, the filtered water is recirculated back to a tank in which the wastewater is stored. After checking whether a desired result has been reached the filtration is begun again.

WO 2001/51186 A1 describes a cross-flow filtration system comprising a filtration module with a filtration membrane comprising a retentate side and a permeate side. The system further comprises a container for a medium to be filtered and a feed pump between the container and the filtration module. Plugging of the flow paths of the retentate caused by solid retentate particles is prevented on the retentate side of the filtration membrane by reducing the pressure on the retentate side of the filtration membrane. This is done by making a connection with the suction side of the feed pump, whereby the pressure is reduced far enough for the permeate flowing back through the filtration membrane to dislodge the obstruction and allow it to be suctioned by the feed pump together with the said retentate particles. This may eliminate the need for pressure-rated permeate tanks.

US 2004/069878 A1 discloses a device and a method for recovering a polishing liquid or slurry wastewater from the polishing step in the manufacture of semiconductors. Agglomerations of abrasion elements in the slurry wastewater are crushed in a mill through ultrasonic oscillation or circulation under pressure. The slurry wastewater is then regenerated and reused.

As already discussed, deposits often form on the retentate side of the filtration membrane in the operation of these kinds of filtration systems. Up until now, the approaches to solve this involve more or less simply back-flushing the filtration membrane to remove these deposits. However, this presents a disadvantage when the thickness of the deposits on the filtration membrane is not uniform in the direction of flow of the retentate. Experience has shown that the greatest thickness is expected to be found at the point where the retentate stream enters, and the thickness of the deposits continuously decreases downstream in the direction of flow. It is also possible for there to be no further deposition downstream. If back-flushing of the filter membrane is done in such a situation, the back-flushing liquid will seek the path of least resistance and will not force away the deposits precisely at the point they are the thickest and most stubbornly attached, but rather the loosely seated deposits, or, it will seek a way around the deposits through the filter membrane. These circumstances are detrimental to a long lifespan of filtration units.

The object of the present invention is to overcome the disadvantages of the prior art, at least to some extent. In particular, the object involves providing a better method for cleaning filters so that longer filtration unit life spans can result.

According to the invention, this object is accomplished by a method for cleaning a filter comprising the following steps:

A) Providing a cross-flow filter, wherein the cross flow filter comprises a filter membrane and is configured to remove a liquid permeate stream from a feed stream that flows past the filter membrane, and wherein the filter membrane comprises a first side facing the permeate stream and a second side opposite the first side and facing the feed stream, and wherein at least some of the deposits to be removed are located on the second side of the filter membrane;

B) Applying a back-flushing liquid stream through the filter membrane, wherein prior to applying the back-flushing liquid stream in Step B), permeate located on the first side of the filter membrane is at least partially displaced from the first side of the filter membrane by a gas, wherein the gas that is in contact with the back-flushing liquid stream has a pressure of >1 bar at least during Step B); and the applying of the back-flushing liquid stream in Step B) occurs in such a way that the pressure of the back-flushing liquid stream switches between a minimum pressure and a maximum pressure more than once.

The cross-flow filter prepared in Step A) can also be called either a cross-flow filter or a tangential-flow filter. For example, it can be designed as a hollow-fibre filter or as a bundle of hollow-fibre filters. The filter membrane is preferably manufactured from a polymer, for example polyacrylonitrile. Furthermore, the filter membrane is at least partially coated with deposits to be removed. Such deposits can be filtered-out abraded particles, polishing element particles and the like.

With respect to the naming of sides relative to the membrane, the first side of the filter membrane can also be called the permeate side, and the second side can be called the retentate side.

According to Step B), a stream of a back-flushing liquid can be applied through the filter membrane. The back-flushing liquid stream is understood to pass through the filter membrane from the first side (the permeate side) to the second side (the retentate side). Simply put, the method according to the invention provides an improvement compared to known back-flushing methods in the form of a pulsating back-flushing of the filter membrane.

To this end, permeate or other liquid which is located on the first side (the permeate side) of the filter membrane is first of all removed. According to the invention, this removal is accomplished by displacement of the said liquid by a gas. The gas can also be air in non-critical cases, but is preferred to be an inert gas such as nitrogen. A wastewater line with a valve is connected to the cross-flow filter, and is used for purposes of the displacement. The liquid is forced out through this line.

After displacement, the situation on the first side (the permeate side) of the filter membrane can be described as a gas cushion having been formed there. This gas cushion then presses against the back-flushing liquid stream.

According to the invention, the pressure of the back-flushing liquid stream is switched between a minimum pressure and a maximum pressure more than once. In other words, the pressure pulsates or oscillates between the minimum pressure and the maximum pressure, wherein the oscillation can be periodic or aperiodic. In case of a periodic oscillation, the pressure fluctuations can assume a sinusoidal or a square shaped profile, for example. So that the back-flushing liquid stream also flows through the filter membrane and not just along the the first side (permeate side), the pressure of the gas cushion is >1 bar, preferably ≥3 bar and more preferably ≥5 bar. Pressure information in the present invention refers to the pressure relative to atmospheric pressure (in case of doubt, 1013 mbar).

The cleaning method according to the invention can be initiated at regular intervals and/or as needed, for example by way of measured pressure differences through the filtration membrane.

The result of a pulsating back-flushing of the filter membrane is a high degree of static friction and high acceleration of the back-flushing liquid. This has an effect on the deposits, dislodging them or at least loosening them so that further cleaning steps can be carried out successfully.

Overall, observations of the life span of an ultrafiltration module used for evaluation purposes showed that the life span increased from a few weeks to about one year. This ultrafiltration module was used in a slurry wastewater concentration plant as described below.

Embodiments and other aspects of the present invention are explained below. They can be combined arbitrarily with one another as long as no clear contradictions result from the relationship.

In one embodiment of the method according to the invention, the back-flushing liquid stream in Step B) comprises previously removed permeate. This permeate can be stored in an appropriately-sized permeate tank, and can be fed to the filter membrane through an appropriately attached back-flush line.

In another embodiment of the method according to the invention, the cross-flow filter is arranged such that the feed stream flows in the vertical direction. It is preferable for the feed stream to enter the cross-flow filter at a lower end, flow therethrough in the vertical direction from the bottom up and leave the cross-flow filter as a retentate stream at an upper end. This way, the effect of gravity on the back-flushing liquid stream flowing through the filter membrane can be utilized, and the back-flushing liquid collects at the lower end of the filter.

In another embodiment of the method according to the invention, the cross-flow filter is an ultrafiltration unit and the feed stream comprises slurry wastewater from a semiconductor treatment process. The ultrafiltration unit is a filtering unit that can remove liquid from the mixed wastewater which is fed to and flows through it. In general, this liquid is water, but other liquids or liquid mixtures which may be used in the semiconductor treatment process can be removed from the mixed wastewater.

The ultrafiltration unit ensures that particles located in the liquid removed from the mixed wastewater have a particle size of ≥0.01 µm to ≤0.1 µm. This is different from a microfiltration unit, for example, in which the removed liquid can comprise particles in the order of magnitude of greater than 0.1 µm. In other words, the term "ultra" in the expression "ultrafiltration unit" is used here to identify the particle size separated from the mixed water together with the liquid by way of the filter device.

The wastewater containing the slurry is preferred to come from the chemical mechanical polishing (CMP) of semiconductors. When it passes through the ultrafiltration unit, the mixed wastewater is concentrated to become concentrated wastewater. This means that the slurry in the concentrated wastewater is present at a higher volume concentration than in the mixed wastewater that was fed to the ultrafiltration unit. Concentration is done by removal of liquid in the ultrafiltration unit, resulting in the increase of solids concentration in the concentrated wastewater compared to the mixed wastewater.

In another embodiment of the process according to the invention, the gas in contact with the back-flushing liquid stream has a pressure of ≥1.5 bar to ≤2.5 bar during Step B). This gas and the pressure of the gas represent the back-pressure for the pulsating back-flushing liquid. The pressure level affects the extent to which the back-flushing liquid moves through the plugged membrane on the permeate side of the filter membrane or in another direction, in general vertically upward. Thus, through selection of the back-pressure, one can determine the extent of the pulsating effect of the back-flushing liquid on the filter membrane. It is preferable for this pressure to be ≥1.7 bar to ≤2.3 bar, more preferably ≥1.9 bar to ≤2.1 bar.

In another embodiment of the method according to the invention, the minimum pressure in Step B) is ≥0 bar to ≤0.5 bar and/or the maximum pressure is ≥2.5 bar to ≤3 bar. This establishes the amplitude of the pressure fluctuations for the back-flushing liquid. It is preferable for the minimum pressure to be ≥0.01 bar to ≤0.4 bar and/or the maximum pressure to be ≥2.6 bar to ≤2.9 bar, more preferably ≥0.1 bar to ≤0.3 bar for the minimum pressure and/or ≥2.7 bar to ≤2.8 bar for the maximum pressure.

In another embodiment of the method according to the invention, the pressure of the back-flushing liquid stream in Step B) switches between the minimum pressure and the maximum pressure at a frequency of ≥0.5 Hz to ≤1 Hz. This determines a frequency range for the pulsating back-flushing. It is preferable for this frequency to be ≥0.55 Hz to ≤0.95 Hz and more preferably ≥0.6 Hz to ≤0.9 Hz. It is also possible for the frequency to remain constant during the flushing process, to the extent this is technically possible.

In another embodiment of the method according to the invention, the following step is carried out after Step B):

C) Contacting the second side of the filter membrane with a liquid comprising gas bubbles distributed therein and wherein the pressure inside the gas bubbles switches between a minimum pressure and a maximum pressure more than once. This liquid can be the back-flushing liquid, and in particular can also be a permeate liquid previously removed. It is preferable for this minimum pressure to be ≥0 bar to ≤0.5 bar and/or this maximum pressure to be ≥2.5 bar to ≤3 bar, more preferably ≥0.01 bar to ≤0.4 bar for this minimum pressure and/or ≥2.6 bar to ≤2.9 bar for this maximum pressure. With regard to the frequency for switching between the minimum and the maximum pressure, it is preferable that it be ≥0.5 Hz to ≤1 Hz and more preferably ≥0.55 Hz to ≤0.95 Hz. It is also possible for this frequency to remain constant to the extent this is technically possible.

Flushing the inside (retentate side) of the filter using a gas-liquid mixture is particularly effective. Due to the thick layers of deposits, higher velocities are found at a lower end of the filter precisely when the gas-liquid mixture flows through such narrowings. Rapid volume fluctuations (explosions and implosions) occur in the gas bubbles due to the pressure fluctuations. These fluctuations have a very dislodging effect on the deposits. Dislodged deposits can be flushed away with the liquid.

In another embodiment of the method according to the invention, the method is carried out in a system comprising:

a cross-flow filter with a filter membrane, a feed line for a material mixture to be filtered, a discharge line for the retentate leaving the cross-flow filter, a liquid extraction line for the permeate leaving the cross-flow filter and a back-flush line;

wherein the discharge line is connected to a gas application line in which a first controllable valve is disposed;

wherein the gas application line and the liquid extraction line are connected together by way of a connecting line in which a second controllable valve is disposed, and the first controllable valve is disposed in the gas application line between the connecting line and the discharge line;

wherein a third controllable valve is disposed in the liquid extraction line and wherein the connection between the liquid extraction line and the connecting line is made between the cross-flow filter and the third controllable valve;

wherein a fourth controllable valve is disposed in the back-flush line; and wherein the feed line is connected to a wastewater line in which a fifth controllable valve is disposed.

The controllable valves can be solenoid valves, for example, and can be connected to a central control unit that uses the opening and closing of the valves to ensure that the method according to the invention runs properly.

It is preferred that the first through the fifth controllable valves be operated in succession before, during and after Step B) as follows:

| | Controllable valve: | | | | |
|---|---|---|---|---|---|
| No. | First | Second | Third | Fourth | Fifth |
| 1 | Closed | Opened | Closed | Closed | Opened |
| 2 | Closed | Closed | Closed | Pulsing | Opened |
| 3 | Closed | Closed | Pulsing | Opened | Opened |

The entry "pulsing" is understood to mean that the respective controllable valve opens and closes more than once. Closing frequencies can be in a range of, for example, ≥0.5 Hz to ≤1 Hz for the individual valves independent of one another.

It is further preferred for the first to the fifth controllable valve to be operated in succession as follows:

| | Controllable valve: | | | | |
|---|---|---|---|---|---|
| No. | First | Second | Third | Fourth | Fifth |
| 4 | Opened | Opened | Closed | Opened | Pulsing |
| 5 | Opened | Closed | Closed | Opened | Pulsing |
| 6 | Opened | Closed | Closed | Closed | Pulsing |

A more detailed explanation of these Step Nos. 1 to 6 is provided in the description of the following FIGS. 2 to 7.

Another object of the present invention is a filter system comprising:

a cross-flow filter with a filter membrane, a feed line for a material mixture to be filtered, a discharge line for the retentate leaving the cross-flow filter, a liquid extraction line for the permeate leaving the cross-flow filter and a back-flush line;

wherein the discharge line is connected to a gas application line in which a first controllable valve is disposed;

wherein the gas application line and the liquid extraction line are connected together by way of a connecting line in which a second controllable valve is disposed, and the first controllable valve is disposed in the gas application line between the connecting line and the discharge line;

wherein a third controllable valve is disposed in the liquid extraction line and wherein the connection between the liquid extraction line and the connecting line is made between the cross-flow filter and the third controllable valve;

wherein a fourth controllable valve is disposed in the back-flush line; and wherein the feed line is connected to a wastewater line in which a fifth controllable valve is disposed.

In a preferred embodiment of the filter system according to the invention, the cross-flow filter is an ultrafiltration unit. For example, it can be designed as a hollow-fibre filter or as a bundle of hollow-fibre filters.

The method according to the invention and the filter system according to the invention are preferred to be used in the recycling of slurry wastewater, in particular slurry wastewater from a semiconductor treatment process such as the CMP process. Therefore, another object of the present invention is a recycling apparatus for recycling of slurry wastewater from a semiconductor treatment process comprising:

a filter system according to the present invention;

a circulation tank for holding wastewater containing slurry;

a wastewater feed line connected to the circulation tank;

a cross-flow filter connected to the circulation tank by way of a feed line for a material mixture to be filtered, the cross-flow filter being a part of the filter system according to the invention, for continuously concentrating mixed wastewater removed from the circulation tank by way of liquid extraction;

a wastewater return line for routing the concentrated wastewater to the circulation tank; and a controller configured to carry out, in temporal succession, a filtration step comprising the continuous feeding of fresh wastewater to the circulation tank while a continuous removal of mixed wastewater from the circulation tank and concentration of said wastewater by way of the ultrafiltration unit is taking place, and then a concentration step in which the feed of fresh wastewater to the circulation tank is reduced or substantially shut off while the continuous removal of mixed wastewater from the circulation tank and concentration of said wastewater by way of the ultrafiltration device is taking place; and furthermore allow a method according to the invention to be run.

The present invention is further described in connection with the following figures, but its description is not limited thereto. Shown are.

Figure 1:
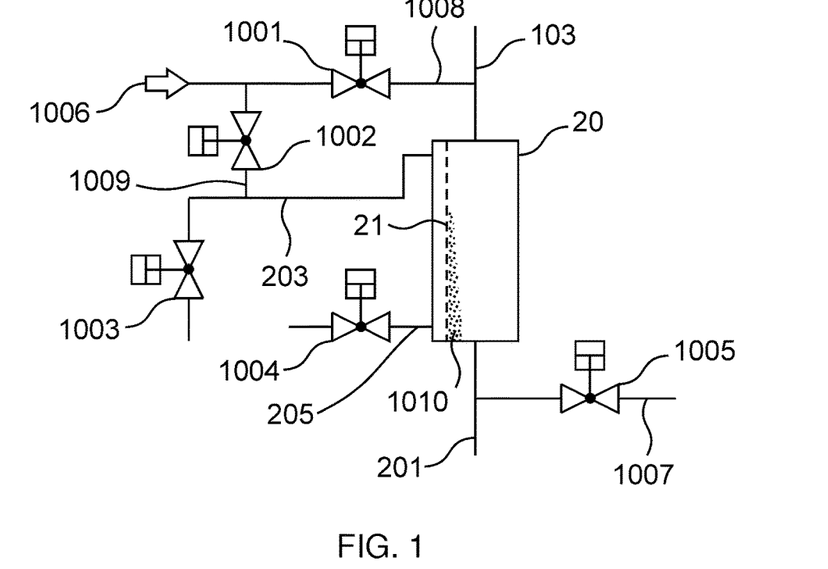
FIG. 1 A cleanable filter system according to the invention

FIG. 1 shows a cleanable filter system according to the invention, wherein the method according to the invention can be carried out using the same. A cross-flow filter 20, preferably designed as an ultrafiltration unit, comprises a filter membrane 21 and is configured to remove a liquid permeate stream from a feed stream passing by the filter membrane 21. To do so, a feed line 201 for a material mixture feed stream to be filtered leads into the cross-flow filter 20, said feed stream possibly being slurry wastewater from a CMP process, for example, and routed away from the cross-flow filter is a discharge line 103 for the concentrated wastewater retentate leaving the cross-flow filter 20.

To utilize the effect of gravity on the back-flushing liquid during cleaning of the filter system, it is preferred that the cross-flow filter 20 be set up such that the material mixture to be filtered flows past the filter membrane 21 from the bottom up in the vertical direction.

The cross-flow filter 20 further comprises a liquid extraction line 203 for the permeate leaving the cross-flow filter 20, as well as a back-flush line 205. The liquid extraction line 203 is located downstream of the back-flush line 205 as seen in the direction of flow of the material mixture to be filtered.

Geometrically speaking, the filter membrane 21 has a first side facing the permeate stream (permeate side) and a second side (retentate side) opposite to the first side, the second side facing the feed stream. In FIG. 1, the first side is to the left of the filter membrane 21 and the second side is to the right.

FIG. 1 further shows that deposits to be removed, 1010, for example abraded or aggregated slurry particles from a CMP process, are located on the second side of the filter membrane 21, at least partially. The layer of deposits 1010 is thickest at the feed inlet level through line 201 and is the most solidly adhered to the filter membrane 21 here as well. The layer thickness of the deposits 1010 decreases continuously downstream as seen in the direction of flow of the feed stream.

It is easy to see that when such a layer of solidly adhering deposits 1010 forms, thereby closing off the filter membrane 21, and when in this case simple back-flushing of the filter membrane 21 is used, the back-flushing liquid would simply climb up the first (left) side of the membrane 21 until it passes through the portion of the filter membrane 21 not covered by deposits 1010, which is the path of least resistance.

In the filter system according to the invention, the discharge line 103 is connected to a gas application line 1008 in which a first controllable valve 1001 is disposed. A gas, preferably an inert gas such as nitrogen, can be introduced to the system through this line 1008 by way of a gas inlet port 1006. The gas application line 1008 and the liquid extraction line 203 are further connected together by way of a connecting line 1009 in which a second controllable valve 1002 is disposed. The first controllable valve 1001 is disposed in the gas application line 1008 between the connecting line 1009 and the discharge line 103. This way, one can use the first controllable valve 1001 and the second controllable valve 1002 to determine which side of the filter membrane 21 is being impinged by gas from the gas inlet port 1006.

A third controllable valve 1003 is disposed in the liquid extraction line 203, wherein the connection between the liquid extraction line 203 and the connecting line 1009 is made between the cross-flow filter 20 and the third controllable valve 1003. Thus, the third controllable valve 1003 is disposed downstream of the connection to the second controllable valve 1002 and to connecting line 1009 as seen in the direction of flow of an exiting permeate.

Finally, there is a fourth controllable valve 1004 disposed in back-flush line 205, and feed line 201 is connected to a wastewater line 1007 in which a fifth controllable valve 1005 is disposed.

Figure 2:
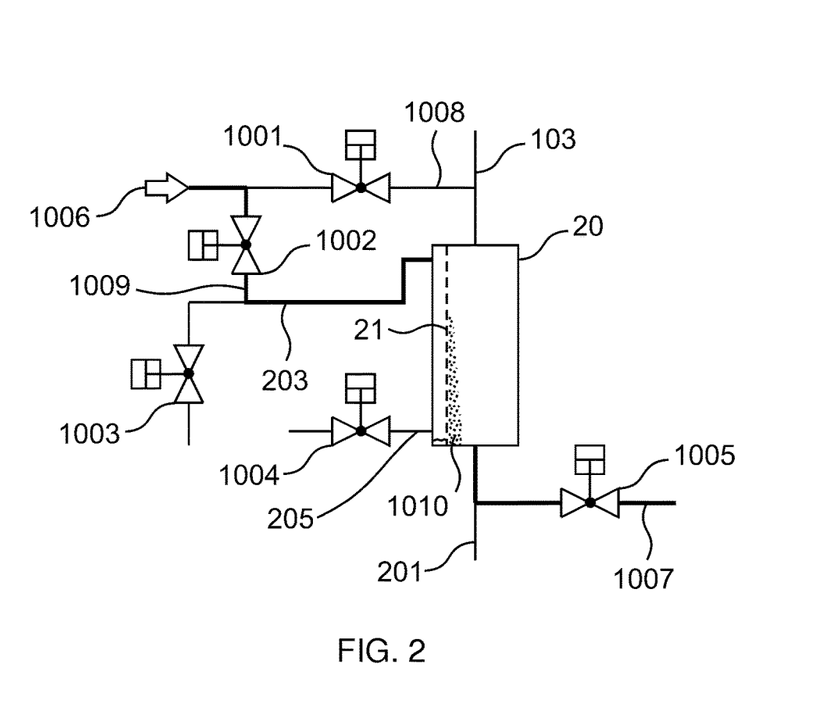
FIG. 2-7 Steps of a method according to the invention

FIG. 2 shows a first step in the method according to the invention. Starting from the filter system shown in FIG. 1, permeate located on the first side of the filter membrane 21 is displaced at least partially from the first side of the filter membrane by a gas. The lines through which a fluid—gas or liquid—flows are drawn schematically with thicker lines. To displace the permeate, the second controllable valve 1002 and the fifth controllable valve 1005 are closed and the first, third and fourth controllable valves 1001, 1003, 1004 are open. Gas applied through the gas inlet point 1006 forces the permeate from the system through the filter membrane 21 through the wastewater line 1007. This is further illustrated by means of the schematically drawn low liquid level on the first side of the filter membrane 21.

Figure 3:
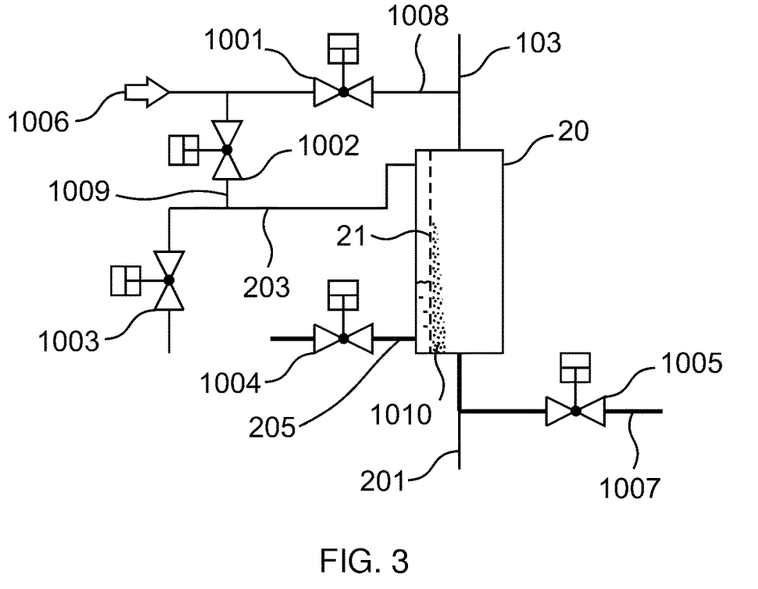

FIG. 3 shows another step in the method according to the invention in which the filter membrane 21 is subjected to pulsing back-flushing. To create this, a gas cushion is formed in the cross-flow filter 20 which creates the necessary back pressure for back-flushing. The first, second and third controllable valves 1001, 1002, 1003 are closed and the fifth controllable valve is opened. The fourth controllable valve located in the back-flush line 205 is operated in pulsing fashion, in other words it is opened and closed repeatedly. The deposits 1010 on the filter membrane are loosened, or can even be directly removed by the pulsing back-flushing.

Figure 4:
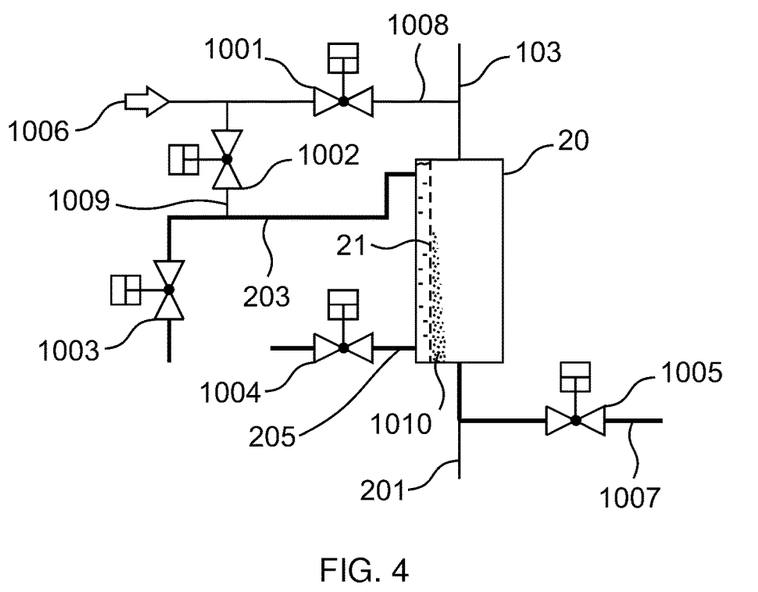

FIG. 4 describes another step in the method according to the invention, namely the pulsing displacement of the gas cushion by the back-flushing liquid. To do so, the fourth controllable valve is opened so that back-flushing liquid can flow into the cross-flow filter 20. Operation of the third controllable valve 1003 in pulsing fashion causes the back-flushing liquid to further climb the left side of the filter membrane 21 in pulsing fashion and forces the gas out through the liquid extraction line 203 and the third controllable valve 1003. In the process, the deposits 1010 in the upper areas of the filter membrane 21 are loosened as well. The first and the second controllable valves 1001, 1002 are closed and the fifth controllable valve 1005 is opened. Then, liquid passing through the filter membrane 21 can be removed from the cross-flow filter 20.

Figure 5:
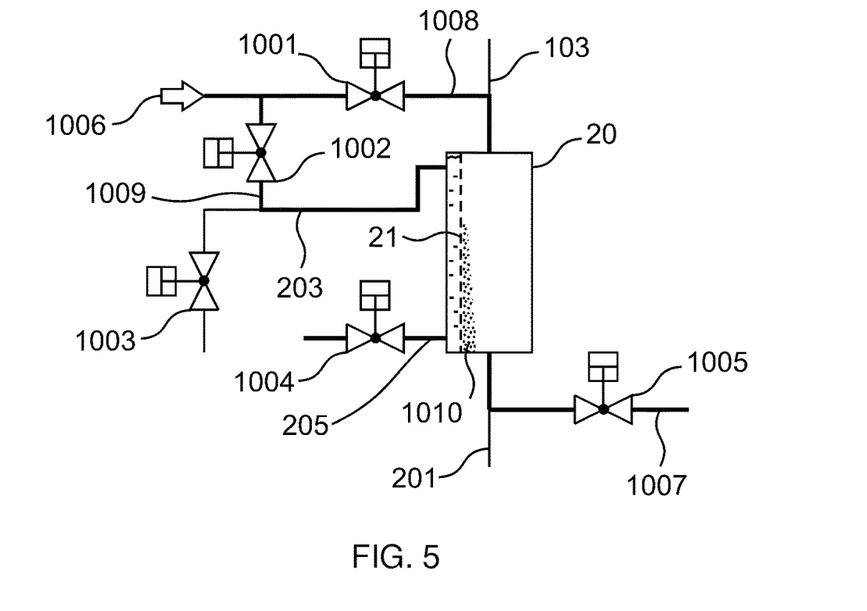

FIG. 5 shows another step in the method according to the invention in which applied gas is humidified. This prevents the filter membrane 21 from being blocked due to dried-on solids, for example due to dried-on slurry residue. The first, second and fourth controllable valves 1001, 1002, 1004 are opened and the fifth controllable valve 1005 is operated in pulsing fashion. The third controllable valve 1003 is closed. The pressure of the liquid flowing in through line 205 causes liquid to climb through lines 203 and 1009 to line 1008, where the liquid comes into contact with gas and the humidified gas continues to the cross-flow filter 20 on the second (right) side of the filter membrane 221.

Figure 6:
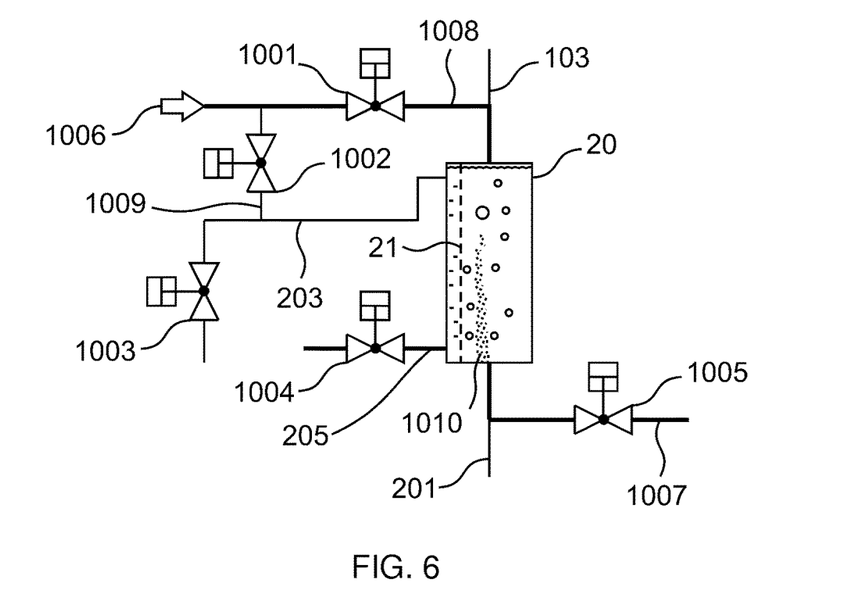

FIG. 6 shows another step in the method according to the invention in which the inside of the cross-flow filter 20 and the second side of the filter membrane are flushed with a gas-liquid mixture in pulsing fashion. To do so, the first and the fourth controllable valves 1001, 1004 are opened and the fifth controllable valve is operated in pulsing fashion. The second and third controllable valves 1002, 1003 are closed. Pulsing the fifth controllable valve 1005 causes pressure fluctuations to occur in the gas bubbles that are inside the cross-flow filter, shown schematically in FIG. 6, which has a very dislodging effect on the deposits 1010. The particles are removed from the liquid in the cross-flow filter 20 through line 1007.

Figure 7:
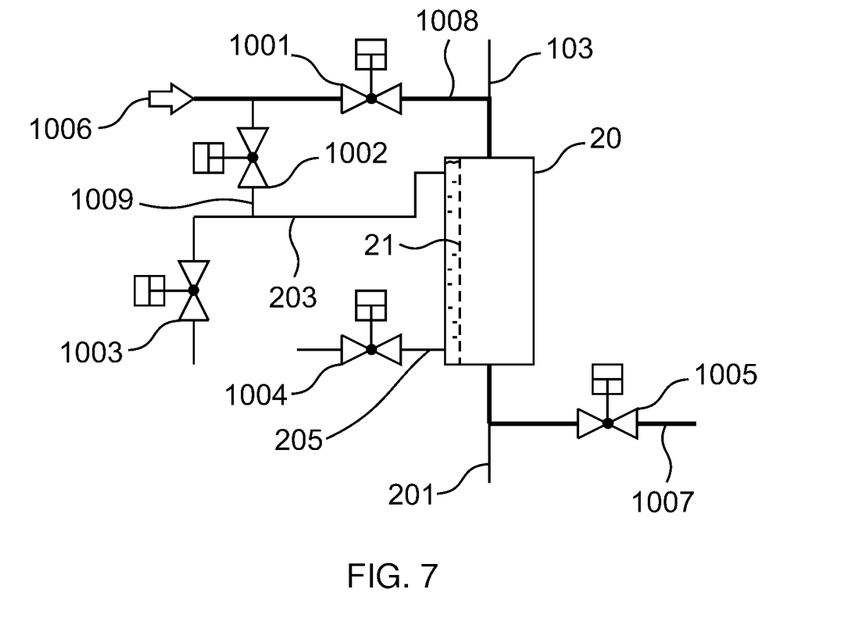

FIG. 7 shows a last step in the method according to the invention. Here, remaining liquid is flushed out of the cross-flow filter 20 from inside the cross-flow filter 20 using gas overpressure. The first controllable valve 1001 is opened and the fifth controllable valve 1005 is opened or is operated in pulsing fashion. The second, third and fourth controllable valves 1002, 1003, 1004 are closed.

Figure 8:
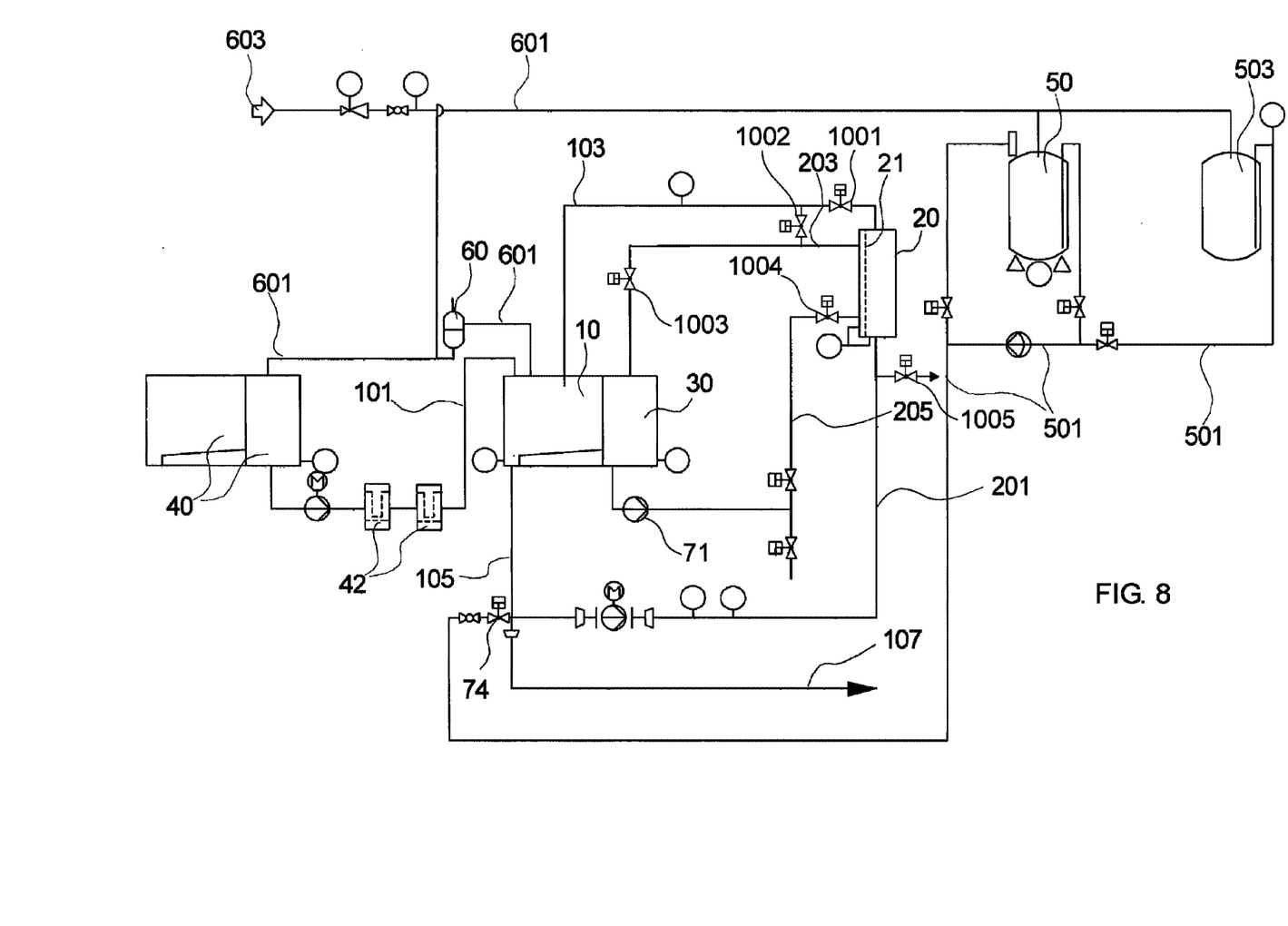
FIG. 8 A recycling system for recycling slurry wastewater

FIG. 8 shows a diagram with the schematic setup of a recycling apparatus for slurry wastewater. The central components of the recycling apparatus include a circulation tank 10 and an ultrafiltration unit 20. The circulation tank 10 and the ultrafiltration unit 20, together with a mixed wastewater removal line 105, an ultrafiltration feed line 201 and a wastewater return line 103, make up a circuit for concentrating the wastewater previously routed to the circulation tank 10. The circulation tank 10 has a capacity of about 500 liters here.

This recycling apparatus further comprises a filter system cleanable according to the invention as was explained in connection with FIG. 1 through 7.

When the mixed wastewater passes through the ultrafiltration unit 20, liquid is extracted, the liquid being present in a liquid circuit comprising a liquid tank 30, a liquid extraction line 203 and a back-flush line 205, wherein the latter is only used occasionally. The ultrafiltration unit 20 in the present embodiment is a membrane filter with a membrane 21, preferably a polymer membrane, for example made of a low-cost, durable polyacrylonitrile. The liquid extracted from the mixed wastewater is thus a permeate. The liquid container 30 is therefore also called a permeate tank 30 below. The permeate tank 30 has a capacity of about 200 liters in this example.

Also shown in FIG. 8 are supply tanks 40 in which the wastewater containing the slurry is kept before it passes along a wastewater feed line 101 through pre-filter 42 to the circulation tank 10.

The recycling apparatus is supplied with nitrogen through a $N_2$ feed 603. The nitrogen is humidified through a $N_2$ humidifier 60 and is fed to the supply tanks 40, the circulation tank 10 and the $NH_3$ containers 50, 503 by way of $N_2$ lines 501. In supply tank 40 and circulation tank 10 the humid $N_2$ blanketing created in this way prevents the formation of a crust of dry slurry at the tank or container walls. Otherwise, there could be the risk that dry slurry particles could return to the recycled slurry and later cause substantial scratching on the semiconductor substrates being treated in the semiconductor treatment process. Once dried, the slurry cannot be re-stabilized.

A filtration step is firstly described below. Fresh wastewater stored in one of the supply tanks 40 is introduced to the circulation tank 10 through the wastewater feed line 101 by means of a fresh wastewater pump 73. Fresh wastewater is continuously fed while mixed wastewater is pumped out of the circulation tank 10 using the circulation pump 70 through the mixed wastewater withdrawal line 105 and routed through the ultrafiltration unit 20 by way of the ultrafiltration feed line 201. The concentrated wastewater leaving the ultrafiltration unit 20 is returned to the circulation tank 10 by way of the wastewater return line 103. When the wastewater passes through the ultrafiltration unit 20, liquid, or permeate, is removed therefrom and routed to the permeate tank 30 by way of the liquid extraction line 203. The permeate can then be removed from the permeate tank 30 using a pump 71 by way of the liquid container outlet 301 and made available to a user by way of liquid utilisation line 303. For example, the permeate can be returned to a semiconductor treatment unit. In this case, it could be necessary to first subject the permeate to further treatment steps. However, it is preferable for the permeate to be removed from the liquid utilisation line 303 and fed to the semiconductor treatment process from which the fresh wastewater came, for example a CMP process, without any additional treatment, in particular without any further filtering.

The filtering activity in the ultrafiltration unit 20 is assumed by a membrane 21 through which the permeate can pass. To prevent a filter cake from forming on the membrane 21 from filter deposits, the membrane 21 may need to be cleaned using the method described above according to the invention.

The wastewater circuit explained above, between the circulation tank 10 and the ultrafiltration unit 20, is also, furthermore, kept substantially in place during a concentration step. This causes mixed wastewater to be continuously removed from the circulation tank 10 by way of the mixed wastewater withdrawal line 105 and routed through the ultrafiltration unit 20 through the ultrafiltration feed line 201. From there, concentrated wastewater is routed to the circulation tank 10 through the wastewater return line 103. The permeate removed from the mixed wastewater in the ultrafiltration unit 20 is routed to the permeate tank 30 through the liquid extraction line 203, and from there is prepared for further use through the liquid container outlet 301 and the liquid utilization line 303.

In contrast to the filtration step, however, no fresh wastewater is routed to the circulation tank 10. Thus, in this phase of the recycling process, the freshwater pump 73 remains inactive. Instead, ammonia (NH$_3$) from the NH$_3$ tank 50 is added to the mixed wastewater in the mixed wastewater withdrawal line 105 through one of the NH$_3$ lines 601. When the NH$_3$ tank 50 is used up, a NH$_3$ supply tank 503 re-supplies it with NH$_3$. Ammonia acts as an agglomeration inhibitor and prevents clumping of solids in the mixed wastewater, the solids concentration of which quickly increases in the concentration step due to the fact that the fresh slurry wastewater remains.

A dispensing step can be introduced after the mixed wastewater in the circulation tank 10 is concentrated using the concentration step to the point that the solids concentration thereof exceeds a pre-determined high concentration threshold. The recycling apparatus is monitored by a plurality of measuring devices 72, which can comprise flow sensors, temperature sensors, concentration sensors, humidity sensors and the like. The solids concentration is determined using concentration meters and are compared to the high concentration threshold in a controller (not shown in the figure).

The invention claimed is:

1. A method for cleaning a filter, comprising the steps of:
A) providing a cross-flow filter, wherein the cross flow filter comprises a filter membrane and is configured to remove a liquid permeate stream from a feed stream that flows past the filter membrane,
and wherein the filter membrane comprises a first side facing the permeate stream and a second side opposite the first side and facing the feed stream,
and wherein at least some of the deposits to be removed are located on the second side of the filter membrane;
B) applying a back-flushing liquid stream through the filter membrane,
characterized in that
prior to applying the back-flushing liquid stream in Step B), permeate located on the first side of the filter membrane is at least partially displaced from the first side of the filter membrane by a gas and forming a gas cushion on the first side of the filter membrane, wherein
the gas cushion presses against the back-flushing liquid stream and the gas cushion that is in contact with the back-flushing liquid stream has a pressure of >1 bar at least during Step B); and
the applying of the back-flushing liquid stream in Step B) occurs in such a way that the pressure of the back-flushing liquid stream switches between a minimum pressure and a maximum pressure more than once.

2. The method according to claim 1, wherein the back-flushing liquid stream in Step B) comprises previously removed permeate.

3. The method according to claim 1, wherein the cross-flow filter is disposed in such a way that the feed stream flows in the vertical direction.

4. The method according to claim 1, wherein the cross-flow filter is an ultrafiltration unit, and the feed stream comprises slurry wastewater from a semiconductor treatment process.

5. The method according to claim 1, wherein the gas in contact with the back-flushing liquid stream has a pressure of $\geq 1.5$ bar to $\leq 2.5$ bar during Step B).

6. The method according to claim 1, wherein the minimum pressure in Step B) is $\geq 0$ bar to $\leq 0.5$ bar and/or the maximum pressure is $\geq 2.5$ bar to $\leq 3$ bar.

7. The method according to claim 1, wherein the pressure of the back-flushing liquid stream in Step B) switches between the minimum pressure and the maximum pressure at a frequency of $\geq 0.5$ Hz to $\leq 1$ Hz.

8. The method according to claim 1, wherein the following step is carried out after Step B):
C) contacting the second side of the filter membrane with a liquid comprising gas bubbles distributed therein and wherein the pressure inside the gas bubbles switches between a minimum pressure and a maximum pressure more than once.

9. The method according to claim 1, wherein the method is carried out in a system comprising a cross-flow filter with a filter membrane, a feed line for a material mixture to be filtered, a discharge line for the retentate leaving the cross-flow filter, a liquid extraction line for the permeate leaving the cross-flow filter and a back-flush line;
wherein the discharge line is connected to a gas application line in which a first controllable valve is disposed;
wherein the gas application line and the liquid extraction line are connected together by way of a connecting line in which a second controllable valve is disposed, and the first controllable valve is disposed in the gas application line between the connecting line and the discharge line;
wherein a third controllable valve is disposed in the liquid extraction line, and wherein the connection between the liquid extraction line and the connecting line is made between the cross-flow filter and the third controllable valve;
wherein a fourth controllable valve is disposed in the back-flush line; and
wherein the feed line is connected to a wastewater line in which a fifth controllable valve is disposed.

10. The method according to claim 9, wherein the first through the fifth controllable valves are operated in succession before, during and after Step B) as follows:

| | Controllable valve: | | | | |
|---|---|---|---|---|---|
| No. | First | Second | Third | Fourth | Fifth |
| 1 | Closed | Opened | Closed | Closed | Opened |
| 2 | Closed | Closed | Closed | Pulsing | Opened |
| 3 | Closed | Closed | Pulsing | Opened | Opened |

11. The method according to claim 10, wherein the first through the fifth controllable valves are operated in succession as follows:

| | Controllable valve: | | | | |
|---|---|---|---|---|---|
| No. | First | Second | Third | Fourth | Fifth |
| 4 | Opened | Opened | Closed | Opened | Pulsing |
| 5 | Opened | Closed | Closed | Opened | Pulsing |
| 6 | Opened | Closed | Closed | Closed | Pulsing |

12. A reprocessing unit for reprocessing of slurry wastewater from a semiconductor treatment process, the reprocessing unit comprising:
  a filter system comprising:
  a cross-flow filter with a filter membrane, a feed line for a material mixture to be filtered, a discharge line for the retentate leaving the cross-flow filter, a liquid extraction line for the permeate leaving the cross-flow filter and a back-flush line;
  wherein the discharge line is connected to a gas application line in which a first controllable valve is disposed;
  wherein the gas application line and the liquid extraction line are connected together by way of a connecting line in which a second controllable valve is disposed, and the first controllable valve is disposed in the gas application line between the connecting line and the discharge line;
  wherein a third controllable valve is disposed in the liquid extraction line, and wherein the connection between the liquid extraction line and the connecting line is made between the cross-flow filter and the third controllable valve;
  wherein a fourth controllable valve is disposed in the back-flush line; and
  wherein the feed line is connected to a wastewater line in which a fifth controllable valve is disposed;
    a circulation tank for holding wastewater containing slurry;
    a wastewater feed line connected to the circulation tank;
    wherein the cross-flow filter is connected to the circulation tank by way of the feed line for the material mixture to be filtered for continuously concentrating mixed wastewater removed from the circulation tank by way of liquid extraction;
    a wastewater return line for routing the concentrated wastewater to the circulation tank; and
    a controller configured to
  carry out, in temporal succession, a filtration step comprising the continuous feeding of fresh wastewater to the circulation tank while a continuous removal of mixed wastewater from the circulation tank and concentration of said wastewater by way of the ultrafiltration unit is taking place, and then a concentration step in which the feed of fresh wastewater to the circulation tank is reduced or substantially shut off while the continuous removal of mixed wastewater from the circulation tank and concentration of said wastewater by way of the ultrafiltration device is taking place; and
  wherein the filter membrane is configured to remove a liquid permeate stream from a feed stream that flows past the filter membrane,
  and wherein the filter membrane comprises a first side facing the permeate stream and a second side opposite the first side and facing the feed stream,
  and wherein at least some of the deposits to be removed are located on the second side of the filter membrane;
  the controller applies a back-flushing liquid stream through the filter membrane,
  wherein:
  prior to applying the back-flushing liquid stream, permeate located on the first side of the filter membrane is at least partially displaced from the first side of the filter membrane by a gas, wherein
  the gas that is in contact with the back-flushing liquid stream has a pressure of >1 bar at least during application of the back-flushing liquid stream; and
  the application of the back-flushing liquid stream occurs in such a way that the pressure of the back-flushing liquid stream switches between a minimum pressure and a maximum pressure more than once.

13. Reprocessing unit according to claim 12, wherein the cross-flow filter is an ultrafiltration unit.

* * * * *